US011506058B2

(12) United States Patent
Colletti et al.

(10) Patent No.: US 11,506,058 B2
(45) Date of Patent: Nov. 22, 2022

(54) TURBOMACHINE COMPONENT WITH SURFACE REPAIR

(71) Applicant: General Electric Company, Schenectady, NY (US)

(72) Inventors: Andrew Joseph Colletti, Greenville, SC (US); Bruce John Badding, Simpsonville, SC (US); Bryan Edward Williams, Greenville, SC (US)

(73) Assignee: General Electric Company, Schenectady, NY (US)

( * ) Notice: Subject to any disclaimer, the term of this patent is extended or adjusted under 35 U.S.C. 154(b) by 866 days.

(21) Appl. No.: 15/822,350

(22) Filed: Nov. 27, 2017

(65) Prior Publication Data

US 2018/0073365 A1   Mar. 15, 2018

Related U.S. Application Data

(62) Division of application No. 14/977,365, filed on Dec. 21, 2015, now Pat. No. 9,879,536.

(51) Int. Cl.
*F01D 5/02* (2006.01)
*B23D 45/00* (2006.01)
(Continued)

(52) U.S. Cl.
CPC ............... *F01D 5/025* (2013.01); *B23C 3/00* (2013.01); *B23D 45/00* (2013.01); *B23P 15/006* (2013.01);
(Continued)

(58) Field of Classification Search
CPC . F01D 5/025; F01D 5/285; F01D 5/02; B23P 15/006; F05D 2300/13;
(Continued)

(56) References Cited

U.S. PATENT DOCUMENTS 2,206,223 A * 7/1940 Dearborn .................. F16B 5/00
403/335
2,879,092 A * 3/1959 Grobel .................... F16D 1/033
403/337
(Continued)

FOREIGN PATENT DOCUMENTS

CN            1110207 A       10/1995
CN        201686160 U       12/2010
(Continued)

OTHER PUBLICATIONS

European Search Report for corresponding EP Application No. 16205048 dated May 16, 2017, 11 pages.
(Continued)

*Primary Examiner* — Topaz L. Elliott
*Assistant Examiner* — Aye S Htay
(74) *Attorney, Agent, or Firm* — James Pemrick; Charlotte Wilson; Hoffman Warnick LLC

(57) ABSTRACT

A component according to the disclosure may include a body having an aperture therein for receiving one of a turbomachine shaft or a lathe chuck, wherein in response to the body being coupled to the lathe chuck, the aperture is oriented substantially axially relative to an axis of rotation of the body with the lathe chuck; and a flange coupled to and in direct axial contact with the body, the flange including a surface that extends axially relative to the axis of rotation of the body, wherein the surface of the flange comprises a matingly engageable face configured to contact an axially aligned surface during operation of the component and having a sanding indentation thereon, wherein a surface roughness of the surface of the flange is less than a surface roughness of a remainder of the component.

10 Claims, 5 Drawing Sheets

(51) Int. Cl.

| | | |
|---|---|---|
| B27C 1/00 | (2006.01) | |
| B24B 27/00 | (2006.01) | |
| B24B 39/06 | (2006.01) | |
| B24B 41/06 | (2012.01) | |
| B24C 1/00 | (2006.01) | |
| B24B 7/04 | (2006.01) | |
| B24B 7/16 | (2006.01) | |
| F01D 25/28 | (2006.01) | |
| B27C 7/00 | (2006.01) | |
| B27C 7/04 | (2006.01) | |
| B23P 15/00 | (2006.01) | |
| B24B 19/26 | (2006.01) | |
| B23C 3/00 | (2006.01) | |
| B26D 3/00 | (2006.01) | |
| F01D 7/00 | (2006.01) | |
| B23D 45/04 | (2006.01) | |

(52) U.S. Cl.
CPC ............... *B24B 7/04* (2013.01); *B24B 7/16* (2013.01); *B24B 19/26* (2013.01); *B24B 27/0038* (2013.01); *B24B 27/0092* (2013.01); *B24B 39/06* (2013.01); *B24B 41/061* (2013.01); *B24B 41/067* (2013.01); *B24C 1/00* (2013.01); *B26D 3/00* (2013.01); *B27C 1/00* (2013.01); *B27C 7/00* (2013.01); *B27C 7/04* (2013.01); *F01D 5/02* (2013.01); *F01D 7/00* (2013.01); *F01D 25/285* (2013.01); *B23D 45/003* (2013.01); *B23D 45/046* (2013.01); *F05D 2230/10* (2013.01); *F05D 2230/90* (2013.01); *F05D 2240/20* (2013.01); *F05D 2240/24* (2013.01); *F05D 2300/13* (2013.01); *F05D 2300/131* (2013.01); *F05D 2300/132* (2013.01)

(58) Field of Classification Search
CPC ......... F05D 2300/131; F05D 2300/132; F05D 2230/10; F05D 2230/90; F05D 2240/24; F05D 2240/20
See application file for complete search history.

(56) References Cited

U.S. PATENT DOCUMENTS

| | | |
|---|---|---|
| 3,070,286 A | 12/1962 | Weaving |
| 3,793,698 A | 2/1974 | Goings |
| 3,866,281 A | 2/1975 | Kunze |
| 3,881,887 A | 5/1975 | McMaster |
| 3,959,929 A | 6/1976 | Fleischmann et al. |
| 4,170,851 A | 10/1979 | Enos |
| 4,222,203 A | 9/1980 | Wolff et al. |
| 4,347,689 A | 9/1982 | Hammond |
| 4,368,567 A | 1/1983 | McMaster |
| 4,430,782 A | 2/1984 | Bomhorst et al. |
| 4,709,508 A | 12/1987 | Junker |
| 4,841,682 A | 6/1989 | Waelti |
| 5,099,558 A | 3/1992 | Wilson |
| 5,191,711 A | 3/1993 | Vickers et al. |
| 5,329,684 A | 7/1994 | Budet et al. |
| 5,507,686 A | 4/1996 | Wolters |
| 5,585,163 A * | 12/1996 | Yoshikawa ............ B23P 11/00 428/133 |
| 5,666,841 A | 9/1997 | Seeger et al. |
| 5,826,453 A | 10/1998 | Prevey, III |
| 6,128,820 A | 10/2000 | Nolan et al. |
| 6,230,380 B1 | 5/2001 | Wang et al. |
| 6,347,980 B1 | 2/2002 | Kamamura et al. |
| 6,431,954 B1 | 8/2002 | Junker |
| 6,622,570 B1 | 9/2003 | Prevey, III |
| 7,010,917 B2 * | 3/2006 | Billington ............ F04D 29/266 123/559.1 |
| 7,185,521 B2 | 3/2007 | Lombardo et al. |
| 8,056,453 B2 | 11/2011 | Savoie |
| 8,512,416 B2 * | 8/2013 | Porter ............ A61F 2/28 623/32 |
| 8,713,775 B2 | 5/2014 | Zhang et al. |
| 8,881,395 B2 * | 11/2014 | Dessoly ............ F01D 5/066 29/889.2 |
| 8,882,566 B2 | 11/2014 | Okamura et al. |
| 8,900,037 B2 | 12/2014 | Jost |
| 9,879,536 B2 | 1/2018 | Colletti et al. |
| 2002/0013123 A1 | 1/2002 | Kamamura et al. |
| 2004/0226420 A1 | 11/2004 | Hill et al. |
| 2007/0289312 A1 | 12/2007 | Daukant |
| 2009/0000303 A1 | 1/2009 | Patel et al. |
| 2009/0067997 A1 | 3/2009 | Wu et al. |
| 2009/0255102 A1 | 10/2009 | McMasters et al. |
| 2011/0052372 A1 | 3/2011 | Lecuyer et al. |
| 2011/0225974 A1 | 9/2011 | Khan et al. |
| 2012/0180488 A1 | 7/2012 | Bailey et al. |
| 2012/0322349 A1 | 12/2012 | Josi |
| 2013/0025289 A1 | 1/2013 | Citeno et al. |
| 2013/0034446 A1 | 2/2013 | Duong et al. |
| 2013/0232792 A1 | 9/2013 | Quinones et al. |
| 2013/0323031 A1 | 12/2013 | Zhang et al. |
| 2013/0323405 A1 | 12/2013 | Burd |
| 2013/0336785 A1 * | 12/2013 | Hummel ............ F01D 5/026 415/220 |
| 2014/0023486 A1 * | 1/2014 | Benjamin ............ C22C 19/055 29/888.012 |
| 2014/0137566 A1 | 5/2014 | Shershnyov et al. |
| 2014/0150434 A1 | 6/2014 | Belsom et al. |
| 2014/0157779 A1 | 6/2014 | Uhm et al. |
| 2014/0165351 A1 | 6/2014 | Hirano et al. |
| 2015/0000290 A1 * | 1/2015 | Joshi ............ F02C 7/16 60/772 |
| 2015/0047162 A1 | 2/2015 | Huning et al. |
| 2015/0273640 A1 | 10/2015 | Li et al. |
| 2016/0222784 A1 | 8/2016 | Espinoza |
| 2016/0237823 A1 * | 8/2016 | Garrard ............ F01D 25/166 |

FOREIGN PATENT DOCUMENTS

| | | |
|---|---|---|
| CN | 102303275 A | 1/2012 |
| CN | 106903575 A | 6/2017 |
| CN | 106994636 A | 8/2017 |
| DE | 19601743 A1 | 7/1997 |
| EP | 3184240 A1 | 6/2017 |
| EP | 3184241 A1 | 6/2017 |
| JP | H570857 U | 9/1993 |
| JP | 3081937 U | 9/2001 |
| JP | 2004042235 A | 2/2004 |
| JP | 2004174627 A | 6/2004 |
| JP | 2005007533 A | 1/2005 |
| JP | 2006138411 A | 6/2006 |
| JP | 2009196048 A | 9/2009 |
| JP | 2017127965 A | 7/2017 |
| JP | 2017127966 A | 7/2017 |
| WO | 2013185603 A1 | 12/2013 |

OTHER PUBLICATIONS

Japanese Office Action and English translation thereof for corresponding JP Application No. 2016-240789 dated Dec. 11, 2020, 7 pages.
U.S. Appl. No. 14/977,374, Office Action dated Aug. 29, 2018, 8 pages.
U.S. Appl. No. 14/977,374, Notice of Allowance dated May 30, 2019, 7 pages.
U.S. Appl. No. 14/977,374, Final Office Action dated Mar. 7, 2019, 7 pages.
European Search Report and Opinion issued in connection with related EP Application No. 16205049.6 dated May 31, 2017.
Non Final Office Action dated May 19, 2017 for U.S. Appl. No. 14/977,365, filed Dec. 21, 2015; pp. 14.
Notice of Allowance dated Nov. 29, 2017 or U.S. Appl. No. 14/977,365, filed Dec. 21, 2015; pp. 20.

(56) References Cited

OTHER PUBLICATIONS

U.S. Appl. No. 16/405,199, Final Office Action dated Jun. 3, 2022, 50 pages.
IN-100:Cast High Temperature Alloy, Alloy Digest, 1970.
Cannon Muskegon, Vacuum Alloys, 2015.
U.S. Appl. No. 16/405,199, Non-Final Office Action dated Feb. 24, 2022, 53 pages.

* cited by examiner

TURBOMACHINE COMPONENT WITH SURFACE REPAIR

BACKGROUND

The disclosure relates generally to the treatment of turbomachine components, and more specifically to surface machining tools, methods of treating components (e.g., turbomachine components) to provide increased friction when contacting axially adjacent components, and/or exhibit greater compressive stress.

Post-deployment treatment of components, such as repair, improvement, refurbishment, etc. (collectively identified herein as "treatment" or "treatments"), can improve the lifespan and quality of a larger turbomachine assembly without requiring the manufacture of a new, complete assembly and/or individual components thereof. Several components of a turbomachine, such as rotatable wheels adapted to receive blades therein, can engage other components via direct mechanical contact during manufacture and/or operation. Frictional contact between the components can help to maintain a desired mechanical relationship between two or more components, e.g., axially adjacent rotor-mounted wheels of a turbomachine assembly.

In a conventional treatment process for a component, a turbomachine servicer can remove the wheel of a turbomachine from its corresponding rotor to apply wet grit blasting to one or more contact surfaces of the wheel. Processes such as wet grit blasting can clean these contact surfaces in addition to altering some of their mechanical properties. Wet grit blasting, however, typically necessitates installing the turbomachine wheel in a dedicated assembly, e.g., a blast booth, thereby increasing the total number of processes and equipment used in a treatment. In addition, wet grit blasting conventionally causes a treated surface to exhibit a greater surface roughness along with an at least partially decreased specific surface area, e.g., caused by removal of material from the surface during the blasting process.

SUMMARY

A first aspect of the disclosure provides a surface treatment tool including: a lathe assembly having a lathe chuck configured to receive a component thereon, wherein the lathe chuck rotates the component about a first axis of rotation, and wherein the component includes an exposed axial target surface oriented axially relative to the first axis of rotation; a sander coupled to the lathe assembly through a tool arm thereof, wherein the sander includes a sanding surface extending along a second axis substantially non-parallel with the first axis of rotation, such that the sanding surface selectively contacts the target surface of the component; and a drive system coupled to the sander for rotating the sander about the second axis, and pressing the sander against the component, to yield a polished target surface having a greater specific surface area and a reduced surface roughness during contact between the component and the sanding surface.

A second aspect of the disclosure provides a method for treating a component, the method including: rotating a target surface of a component about a first axis of rotation; rotating a sanding surface of a sander about a second axis, wherein the second axis is substantially non-parallel with the first axis of rotation; and contacting the sanding surface of the sander with the target surface of the component, during the rotating of the target surface and the rotating of the sanding surface, to yield a polished target surface having a greater specific surface area and a reduced surface roughness, wherein a frictional coefficient between the polished target surface and an adjacent component is greater than an initial frictional coefficient between the target surface and the adjacent component.

A third aspect of the present disclosure provides a component including: a body having an aperture therein for receiving one of a turbomachine shaft and a lathe chuck, wherein in response to the body being coupled to the lathe chuck, the aperture is oriented substantially axially relative to an axis of rotation of the body with the lathe chuck; and a flange coupled to the body and including a surface that extends axially relative to the axis of rotation of the body, wherein the surface of the flange includes an indentation, and wherein a surface roughness of the surface of the flange is greater than a surface roughness of a remainder of the component.

A fourth aspect of the present disclosure provides a surface treatment tool including: a lathe assembly having a lathe chuck configured to receive a component thereon, wherein the lathe chuck rotates the component about a first axis of rotation, and wherein the component includes an exposed axial target surface oriented axially relative to the first axis of rotation; a burnishing roller coupled to the lathe assembly and including a burnishing surface thereon, wherein the burnishing surface is configured to rotate about a second axis of rotation substantially non-parallel with the first axis of rotation, such that the burnishing surface selectively contacts the target surface of the component to impart a compressive stress against the component; and a drive system coupled to the sander for rotating the sander about the second axis of rotation, and pressing the sander against the component, to yield a polished target surface having a greater specific surface area and a reduced surface roughness during contact between the component and the sanding surface.

A fifth aspect of the present disclosure provides a method for turbomachine treatment, including: rotating a target surface of a component about a first axis of rotation; rotating a burnishing surface of a burnishing roller about a second axis of rotation, wherein the second axis of rotation is substantially non-parallel with the first axis of rotation; and contacting the burnishing surface of the burnishing roller with the target surface of the component, during the rotating of the target surface and the rotating of the burnishing surface, to yield a polished target surface having a greater specific surface area and a reduced surface roughness, and to impart a residual compressive stress to the component, wherein a frictional coefficient between the polished target surface and an adjacent component is greater than an initial frictional coefficient between the target surface and the adjacent component.

A sixth aspect of the disclosure provides a component, including: a rotatable body having an aperture therein for receiving one of a turbomachine shaft and a lathe chuck, wherein the aperture is oriented substantially axially relative to an axis of rotation of the rotatable body; and a flange coupled to the body and including a surface that extends axially relative to the axis of rotation of the body, wherein the surface of the flange includes an indentation, and wherein a surface roughness and a compressive stress of the surface of the flange are each greater than a surface roughness and a compressive stress of a remainder of the component.

BRIEF DESCRIPTION OF THE DRAWINGS

These and other features of the disclosed system will be more readily understood from the following detailed description of the various aspects of the system taken in conjunction with the accompanying drawings that depict various embodiments, in which.

It is noted that the drawings are not necessarily to scale. The drawings are intended to depict only typical aspects of the disclosure, and therefore should not be considered as limiting its scope. In the drawings, like numbering represents like elements between the drawings.

DETAILED DESCRIPTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be used and that changes may be made without departing from the scope of the present teachings. The following description is, therefore, merely illustrative.

Embodiments of the present disclosure can provide surface treatment tools for turbomachinery, methods for treating a component, and/or components with various technical properties discussed herein. A surface treatment tool according to the present disclosure can be embodied as a lathe assembly with a corresponding lathe chuck. The lathe chuck can receive a component thereon, e.g., a wheel of a turbomachine adapted for being coupled to a rotor. The lathe chuck can rotate the component about a first axis of rotation, and the component can include an exposed target surface when positioned on the lathe chuck. In one embodiment, the lathe assembly can also include a sanding instrument (referred to herein as a "sander"), as one type of contrast to conventional wet surface treating tools. The sander can include a sanding surface capable of rotation about a second axis of rotation, distinct from (i.e., non-parallel with) the axis of rotation of the lathe chuck. In another embodiment, the lathe assembly can include a burnishing roller for providing a different type of dry surface treatment. The burnishing roller can thus include a burnishing surface and can rotate about a second axis of orientation distinct from the rotation axis of the lathe chuck. A sander and/or burnishing roller in embodiments of the present disclosure can be composed of one or more structures capable of creating a polished target surface of the component, e.g., one or more metals, metal alloys, etc. The polished target surface can exhibit a decreased surface roughness and/or an increased specific surface area as a direct result of the sanding or burnishing. During operation, surface finish and metallic cohesion between the components due to machining by the sander and/or burnishing roller can increase friction of the target surface and/or impart a residual compressive stress to the component. A "residual stress," as used herein, refers to a stress which remains present in a material after the mechanical forces giving rise to the stress have been removed. A "residual compressive stress" thus refers to a plastic deformation of material in which the material is compressively deformed (i.e., pressed inward) such that the material continues to exhibit a compressive-type stress on its surface after the burnishing of the material.

Figure 1:
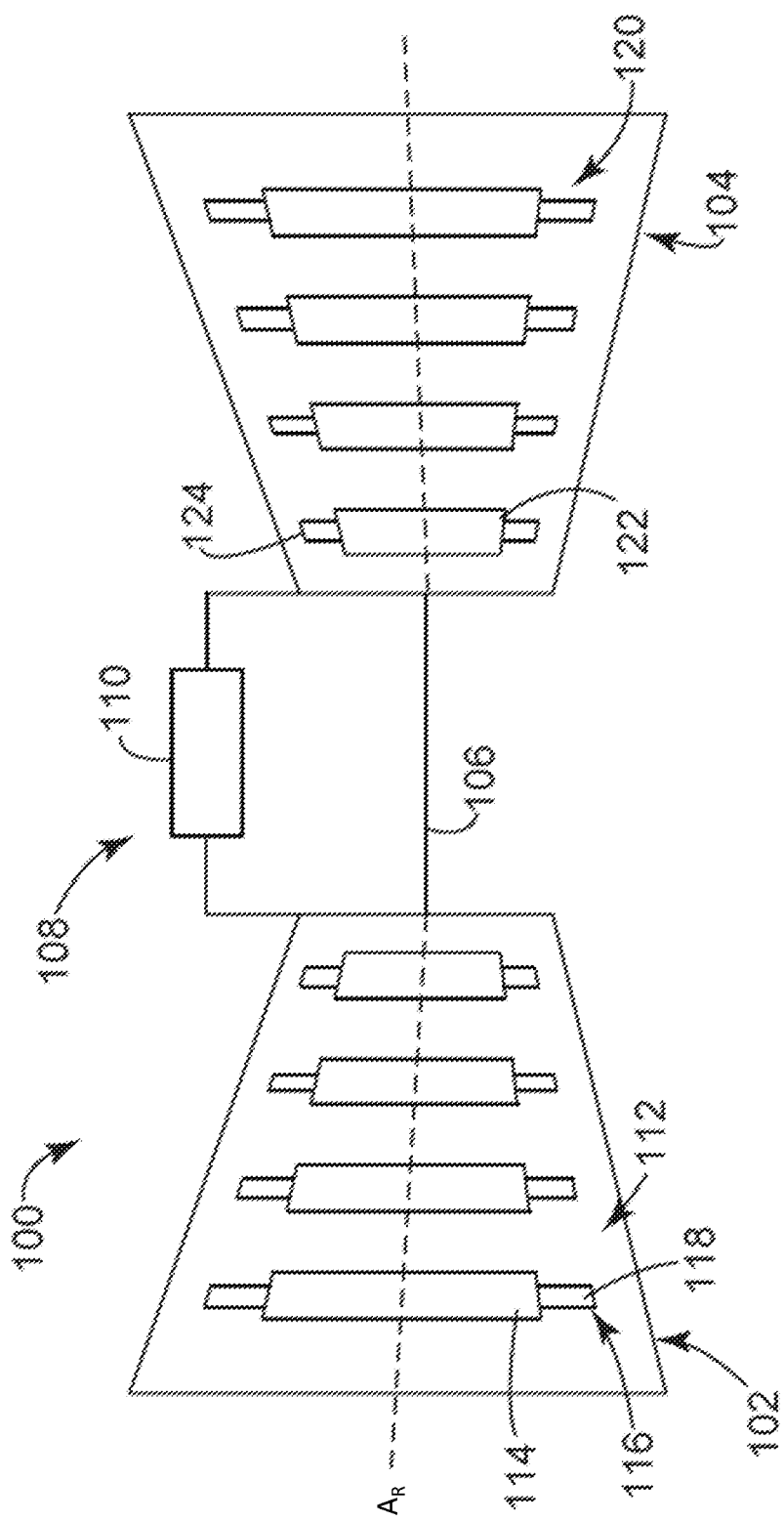
FIG. 1 is a perspective view of a conventional turbomachine system.

FIG. 1 shows a conventional turbomachine 100 that includes a compressor portion 102 operatively coupled to a turbine portion 104 through a common compressor/turbine shaft 106. As used herein, the terms "axial" and/or "axially" refer to the relative position/direction of objects along axis $A_R$, which is substantially parallel with the axis of rotation of the turbomachine (in particular, the rotor section). Additionally, the terms "circumferential" and/or "circumferentially" refer to the relative position/direction of objects along a circumference which surround a particular axis but does not intersect the same axis at any location.

Compressor portion 102 can be fluidically connected to turbine portion 104 through a combustor assembly 108. Combustor assembly 108 includes one or more combustors 110. Combustors 110 may be mounted to turbomachine 100 in a wide range of configurations including, but not limited to, being arranged in a can-annular array. Compressor portion 102 includes a plurality of compressor rotor wheels 112. Rotor wheels 112 include a first stage compressor rotor wheel 114 having a plurality of first stage compressor rotor blades 116 each having an associated airfoil portion 118. Similarly, turbine portion 104 includes a plurality of turbine rotor wheels 120 including a first stage turbine wheel 122 having a plurality of first stage turbine rotor blades 124. In accordance with an exemplary embodiment, one or more rotor wheels 112, 114, 120, 122 can be machined by the implementation of portable milling devices and/or milling techniques. It will be understood, however, that other components of turbomachine 100, and/or similar components within other turbomachine systems, can also be machined with one or more portable milling tools discussed herein, or otherwise subjected to embodiments of the processes described herein.

Figure 2:
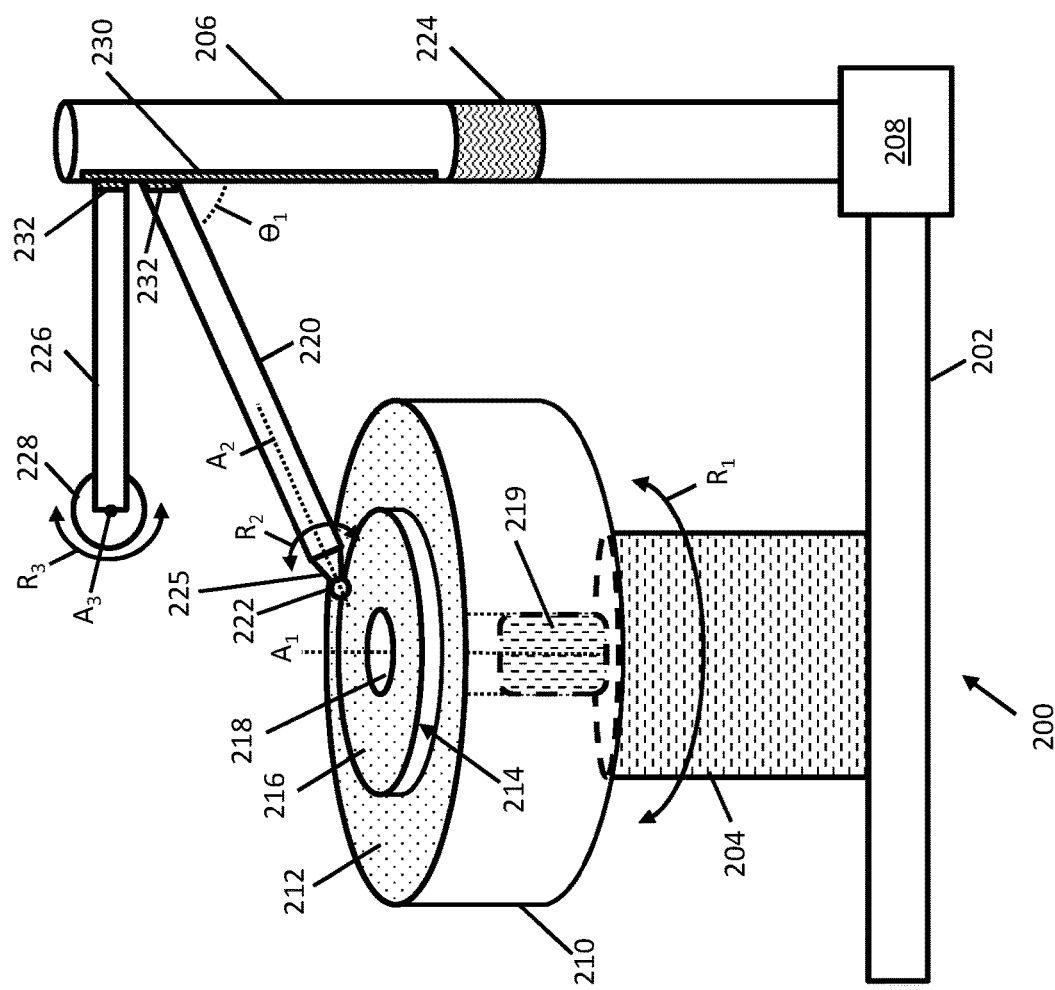
FIG. 2 provides a perspective view of a surface treatment tool and component according to embodiments of the present disclosure.

Turning to FIG. 2, a surface treatment tool 200 according to embodiments of the present disclosure is shown. Surface treatment tool 200 can include a lathe assembly 202. Lathe assembly 202, in turn, can include a lathe chuck 204, a tool arm 206, and an assembly drive system 208 for transmitting and/or producing mechanical power for operating one or more of the components and sub-components discussed herein. Lathe chuck 204, which can also be known and referred-to as a "toolpost," can be provided as a rotatable platform having a simple or composite three-dimensional shape configured to receive a component thereon. In an example embodiment, lathe chuck 204 can be substantially cylindrical in shape and can have a diameter substantially equal to that of a turbomachine rotor. Lathe chuck 204 can be adapted to rotate about a first axis of rotation $A_1$, and substantially along a first rotational path $R_1$. Tool arm 206 can include one or more machining elements thereon, as discussed elsewhere herein, such that tool arm 206 can be positioned to provide other surface treatments to components coupled to lathe chuck 204.

Assembly drive system 208 can be coupled to or otherwise can include a motor system housed, e.g., within the structure of tool arm 206. The motor system of assembly drive system 208 can convert various types of power (e.g., fuels, electricity, etc.) into mechanical energy for actuating components of lathe assembly 202 as discussed herein. For example, the motor system can rotate lathe chuck 204 to allow treatment of components thereon, and/or to drive one or more tools coupled to tool arm 206. The structure of lathe assembly 202 can be appropriately sized to house the components of any currently known or later developed motor system (e.g., an electric motor system). In an embodiment, drive mechanism 208 can be directly or indirectly mechanically coupled to lathe chuck 204 to permit rotation of lathe chuck 204 about first axis of rotation $A_1$.

Lathe chuck 204 of lathe assembly 202 can receive a component 210 thereon. Turbomachine component 210 can be provided in the form of one or more pieces of rotary equipment adapted to rotate about a rotor of a turbomachine such as a gas turbine, steam turbine, water turbine, etc. In an example embodiment, component 210 can be in the form of turbine wheel 122 (FIG. 1) adapted to hold, e.g., a plurality of blade elements such as turbine rotor blades 124 (FIG. 1) extending radially therefrom. To this extent, component 210 can also include a plurality of radial dovetails and/or dovetail slots (not shown) on a radial surface thereof, relative to first axis of rotation $A_1$. Turbomachine component 210 can also include an axial face 212 configured to engage and/or receive other components of a turbomachine.

Turbomachine component 210 can include or be otherwise coupled to a flange 214 positioned, e.g., on axial face 212. Flange 214 can thus include an exposed axial target surface 216 for contacting and/or otherwise engaging an axially adjacent component during the operation of a turbomachine such as turbomachine 100. The entirety or a portion of component 210, including flange 214 and/or axial target surface 216, can be composed of steels, and/or alloys (e.g., steel-based and/or nickel-based alloys) including superalloy materials, and in some embodiments may include one or more of Chromium (Cr), Molybdenum (Mo), Nickel (Ni) or Vanadium (V). It is thus understood that many material compositions of component 210 are contemplated. Although flange 214 is shown by example in FIG. 2 to be directly axially coupled to the remainder of turbomachine 210, it is understood that one or more intervening structures may be present based on the type of component 210 being treated.

An aperture 218 can extend axially through component 210, including flange 214. Aperture 218 can be adapted to receive and/or slidably engage a rotor of a turbomachine therein, e.g., rotor 106 (FIG. 1). Lathe chuck 204 can receive component 210 by including a rotatable coupling 219 in the form of, e.g., an axial projection from lathe chuck 204 having substantially the same cross-sectional area as aperture 218. Rotatable coupling 219, as shown in FIG. 2, can be shaped to permit rotational movement of component 210 with and/or on lathe chuck 204. Rotatable coupling 219 can optionally include interlocking features (e.g., mechanically activated and/or deactivated locks) to retain component 210 in a fixed position relative to rotatable coupling 219, while permitting rotation of component 210 during through lathe chuck 204. It is understood that rotatable coupling 219 can be embodied as one or more other components configured to mechanically engage and/or be positioned within aperture 218. It is understood that lathe chuck 204 can receive and rotatably engage component 210 by one or more other currently known or later developed types of rotatable coupling.

During operation as part of a turbomachine system, flange 214 of component 210 can contact and engage an axially adjacent component, e.g., another flange of an adjacent wheel. An operator may desire for each component mounted on rotor 114 (FIG. 1) to maintain a consistent relative circumferential position during use, and for treatment processes to maintain this physical relationship. In some cases and in some conditions, mating surfaces such as axial target surface 216 may exhibit a reduced frictional coefficient (i.e., a factor representing the strength of frictional forces on a material's surface) from extended contact with other components and subsequent mechanical wear, thereby resulting in negative effects such as possible rotational slipping of one component relative to another. Repair instruments of lathe assembly 202 can contact axial target surface 216 to increase a coefficient of friction of axial target surface 216, e.g., by reducing the surface roughness of axial target surface 216 while increasing the specific surface area of axial target surface 216. As used herein, the term "specific surface area" generally represents the exposed surface area of material on a microscopic level. Changes to the specific surface area of a material may not be cognizable to an ordinary observer, yet may cause substantial changes in mating engagement between one material and another material. In applications according to the present disclosure, a smoother (i.e., lower) surface roughness can be associated with an increased frictional coefficient between one material and another (e.g., by providing an increased surface area of contact), thereby increasing the specific surface area of axial target surface 216 and its corresponding frictional coefficient. In an example embodiment, a sander 220 can be coupled to lathe assembly 202 through tool arm 206, and can include a sanding surface 222 thereon. Sanding surface 222 can rotate about a second axis of rotation $A_2$, such that sanding surface 222 can rotate substantially along the direction indicated with arrows $R_2$. Second axis of rotation $A_2$ can be substantially non-parallel with first axis of rotation $A_1$, e.g., by having an angular differential $\Theta_1$, having a value of, e.g., between approximately 5° and 175° or between approximately 185° and approximately 355° relative to first axis of rotation $A_1$. It is understood that, in some embodiments $\Theta_1$ can have a value of approximately 90° and thereby cause second axis of rotation $A_2$ to extend substantially perpendicularly relative to first axis of rotation $A_1$. To permit rotational movement of sanding surface 222, sander 220 can be provided in the form of, e.g., a drum sander with sanding surface 222 provided circumferentially thereon. In the context of angular orientations, the terms "substantial" or "substantially" can encompass, in addition to the stated relationship between reference axes, any and all angular relationships within an insubstantial margin of error (e.g., within 1%, 5%, 10%, etc.) of the defined angular relationship (e.g., parallel, perpendicular, etc.).

Figure 3:
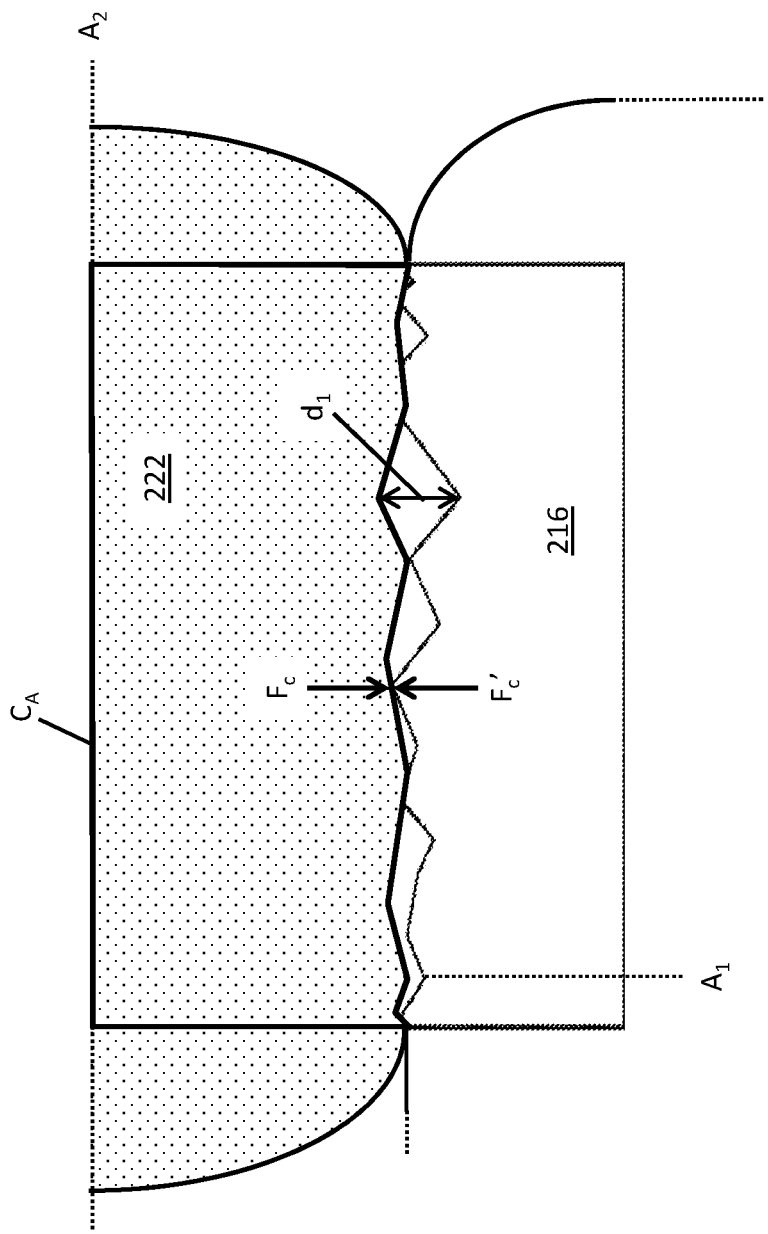
FIG. 3 provides an enlarged, partial cross-sectional view of a surface treatment tool and target surface according to embodiments of the present disclosure.

Referring to FIG. 3, an enlarged cross-sectional view of sanding surface 222 and axial target surface 216 is provided to demonstrate a surface treatment of component 210 (FIG. 2). During operation of surface treatment tool 200 (FIG. 2), sanding surface 222 can selectively contact axial target surface 216 of flange 214 (FIG. 2) on component 210 (FIG. 2), e.g., within contact area $C_A$. To reduce the surface roughness of axial target surface 216, sanding surface 222 can contact axial target surface 216 while rotating about second axis rotation $A_2$. Turbomachine component 210 and flange 214 can rotate about first axis of rotation $A_1$. As axial target surface 216 rotates and contacts the rotating sanding surface 222, at least a portion of axial target surface 216 can be treated from indentations in axial target surface 216 created by sanding surface 222. In other embodiments, sanding surface 222 may remain stationary or may radially oscillate during contact with axial target surface 216. Thus, many forms of relative motion between sanding surface 222 and axial target surface 216 are contemplated as axial target surface 216 rotates about first axis of rotation A1. In addition, the contact between sanding surface 222 and axial target surface 216 can increase the specific surface area of axial target surface 216, thereby increasing the total amount of contact between component 210 and any components positioned adjacent to axial target surface 216.

The material composition of sanding surface 222 can be composed of one or more materials which polish axial target surface 216 to have a corresponding surface finish with, e.g., reduced surface roughness and increased specific surface area. For example, where turbomachine 210 (FIG. 2) and/or flange 214 are composed of a metallic substance such as, e.g., steels and/or superalloy materials (e.g., superalloy materials), sanding surface 222 can also be composed of a metallic substance. In an embodiment, axial target surface 216 of flange 214 can be composed wholly or partially of Mo, Cr, and/or V, as described herein. Metallic cohesion between axial target surface 216 and adjacent components can thereby be caused by similarities in the material composition of each component, which can cause like atoms in one substance to become electrically attracted to atoms in the other substance. The occurrence of metallic cohesion can thereby create an attractive force between axial mating surface 216 of component 210 and adjacent rotor-mounted elements of a turbomachine assembly. Pressing forces between axial mating surface 216 and sanding surface 222 are represented by example in FIG. 3 with vectors $F_c$ and $F_c'$. The polished surface of axial mating surface 216 can, as a result, exhibit an increased frictional coefficient when placed in contact with an adjacent component due to both the reduced surface roughness and increased specific surface area. Among other things, these effects can increase torque transmission between component 210 and adjacent components during operation of turbomachine 100 (FIG. 1).

In contrast to conventional treatment techniques, which may rely upon, e.g., using an abrasive material or material with a rough surface profile (relative to axial target surface 216) to reduce the smoothness and surface area of a treated surface, sanding surface 222 can have a smooth surface with a greater area relative to the surface profile of axial target surface 216. That is, rather than assuming substantial peak-to-peak or valley-to-valley contact between axial target surface 216 and a material with a similarly rough surface profile, sanding surface 222 can treat axial target surface 216 in part by intentionally reducing the roughness of axial target surface 216 to thereby increase its total specific surface area. In an example embodiment, sanding surface 222 can have a lower surface roughness than an initial surface roughness of axial target surface 216. This contact between the two polished, substantially flat surfaces can increase the frictional coefficient between axial target surface 216 and adjacent axial surfaces of other components during operation.

Returning to FIG. 2, tool arm 206 of lathe assembly 202 can include additional components to provide further surface treatment of turbine component 210. Specifically, tool arm 206 can be configured to treat turbine component 210 and/or flange 214 in multiple processes without removing turbine component 210 from lathe chuck 204. For example, tool arm 206 can include an actuator 224 therein for adjusting the position of sander 220, and/or other tools coupled to lathe assembly 202, relative to component 210. Actuator 224 can be provided as any currently-known or later developed device for providing a variable length dimension when included as part of a structural component. For example, actuator 224 can be embodied as one or more of, e.g., a linear actuator, a piezoelectric actuator, a pneumatic actuator, a servo actuator, a nano actuator, a hydraulic actuator, a motor-driven actuator, and/or any other currently known or later-developed mechanism for providing an adjustable length.

Varying the position of sander 220 and/or the length of tool arm 206, can adjust the separation distance between component 210 and machining elements of tool arm 206 such as sander 220. By adjusting tool arm 206, e.g., with actuator 224, sander 220 can be brought into and/or out of contact with component 210. In addition, sander 220 can include an internal drive system 225 therein for pressing sanding surface 222 against component 210 during treatments. In alternative embodiments, internal drive system 225 can be provided within tool arm 206 and can be operatively connected to sander 220, e.g., through a mechanical coupling, electrical coupling, pneumatic coupling, hydraulic coupling, etc. It is understood that the functions of internal drive system 225 can be provided, e.g., by assembly drive system 208. In any event, internal drive system 225 can be embodied as one or more of, e.g., a pneumatic drive system, an electromechanical motor, a hydraulic drive system, etc.

Lathe assembly 202 can also include a trimming tool 226, e.g., coupled to tool arm 206. Trimming tool 226 can be structurally independent from sander 220, such that trimming tool 226 can be used in combination with and/or separately from sander 220. Trimming tool 226 can include a trimming element 228 provided in the form of, e.g., a saw cutter, a screw-cutter, a water cutter, and/or any other currently known or later developed types of cutting bits for removing portions of a workpiece on lathe assembly 202, e.g., turbine component 210. Regardless of the embodiment used, trimming element 228 can also be configured to rotate about a third axis of rotation $A_3$ (extending into page), which can be distinct from first and/or second axes of rotation $A_1$, $A_2$. For instance, third axis of rotation $A_3$ for trimming element 228 can be substantially perpendicular to first and second axes of rotation $A_1$, $A_2$, e.g., by extending into and out of the page in the perspective view of FIG. 2. Trimming tool 226 can thereby provide preliminary machining of component 210, e.g., by removing larger amounts of material from component 210 without treating the components treated with sander 220, e.g., axial target surface 216 of flange 214.

To bring sander 220, trimming tool 226, and/or other treatment tools into contact with component 210, tool arm 206 can include a track 230. More specifically, bearings 232 of sander 220, trimming tool 226, and/or other tools can be mechanically coupled to track 230 such that sander 220, trimming tool 226, and/or other tools can selectively move across tool arm 206, e.g., toward or away from component 210. The coupling between track 230 and each bearing 232 can be provided as, e.g., a rolling bearing, a sliding and mating engagement, a magnetic or magnetic/mechanical engagement, etc. A user can manually move sander 220, trimming tool 226, and/or other tools coupled to track 230 during operation manually or with the aid of other tools included within and/or external to tool arm 206. For example, tool arm 206 can include an actuation system therein (operated, e.g., by electrical power, hydraulic fluids, etc.) for moving sander 220, trimming tool 226, etc., across track 230. In embodiments where track 230 is omitted, components of tool arm 206 such as sander 220 and/or trimming tool 226 can be provided in fixed positioned on tool arm 206, such that actuator 224 can move sander 220 and/or trimming tool 226 closer towards or further away from component 210. It is also understood that mechanical engagement through track 230 and movement from actuator 224 can be used together where desired and/or applicable. In still other embodiments, internal drive system 225 of sander 220 and/or other drive systems can also move tools coupled to tool arm 206 across track 230. Regardless of the embodiment used, track 230 can allow sander 220, trimming tool 226, and/or other components of tool arm 206 coupled to track 230 to move into and/or out of contact with component 210.

Figure 4:
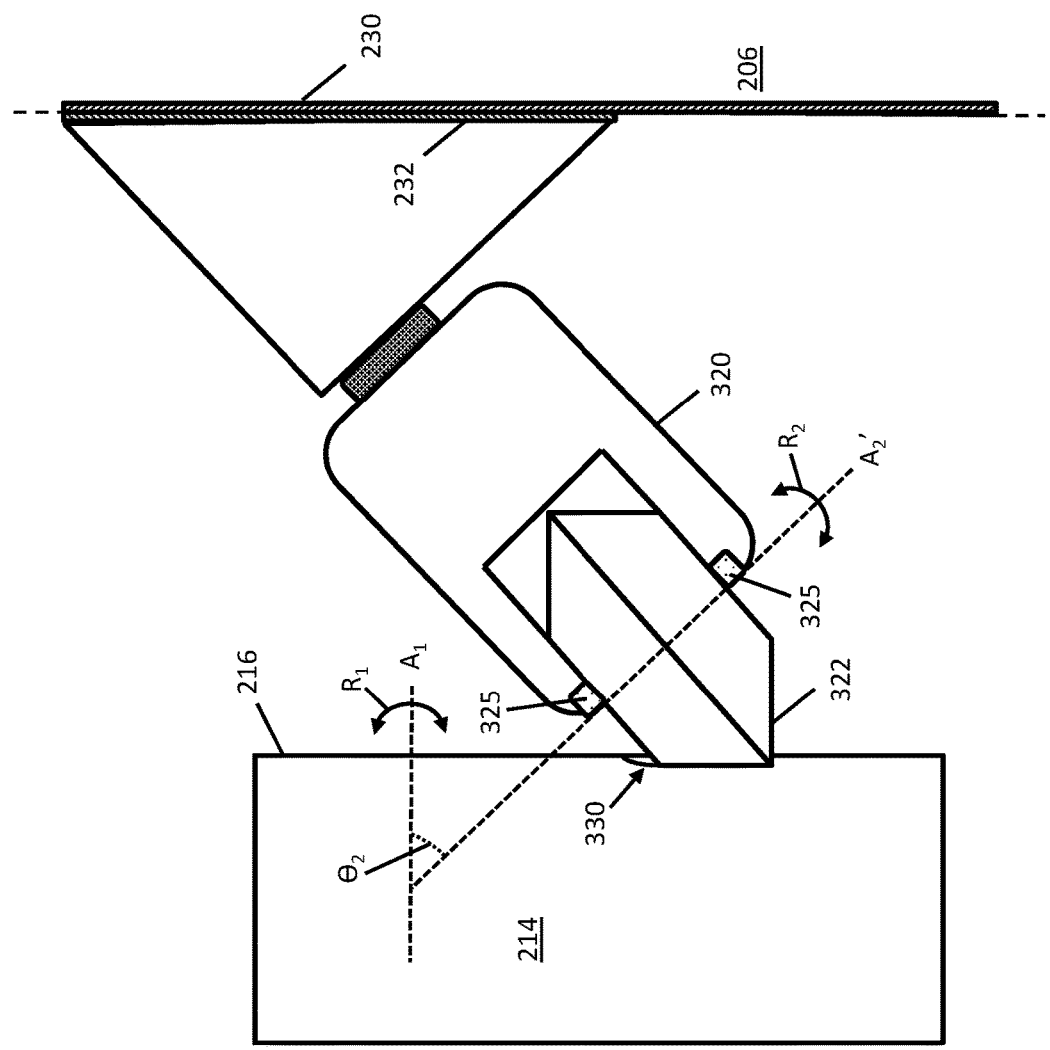
FIG. 4 provides a partial cross-sectional view of a surface treatment tool contacting a component according to embodiments of the present disclosure.

Referring to FIG. 4, embodiments of surface treatment tool 200 can include other instruments for treating axial target surface 216. For example, tool arm 206 can include a burnishing roller 320 with a burnishing surface 322 thereon. Burnishing roller 320 can, optionally, include bearing 232 for coupling burnishing roller 320 to track 230 of tool arm 206. Burnishing surface 322 can be rotatably attached to a remainder of burnishing roller 320 such that burnishing surface 322 rotates along line $R_2$ about a second axis of rotation $A_2'$, oriented in a non-parallel direction relative to first axis of rotation $A_1$. The difference in angular orientation between axes of rotation $R_1$, $R_2'$, can be represented by an angular differential $\Theta_2$ having a value of, e.g., between approximately 5° and 175° or between approximately 185° and approximately 355°. Burnishing surface 322 can be composed of one or more pure metals and/or metal alloys capable of deforming a surface by way of sliding contact to impart a residual compressive stress to the material being burnished. As examples, burnishing surface 322 can be composed of, e.g., steels and/or superalloy materials. During operation, an internal drive system 325 of burnishing roller 320 and/or movement of burnishing roller 320 relative to tool arm 206 can bring burnishing surface 322 into contact with axial mating surface 216 of flange 214, such that rotating burnishing surface 322 rolls against axial mating surface 216. Internal drive system 325 can be embodied as one or more of the example systems discussed elsewhere herein relative to internal drive system 225 (FIG. 2), and alternatively can be embodied as assembly drive system 208 operatively coupled to burnishing roller 320.

The rolling of burnishing surface 322 against axial mating surface 216 can create an indentation 330 therein, and thereby can increase a residual compressive stress of axial mating surface 216. During operation, internal drive system 325 can mechanically press burnishing surface 322 against component 210 to increase metallic cohesion between component 210 and any axially adjacent components. Thus, the use of burnishing roller 320, as part of lathe assembly 202, can impart a residual compressive stress to axial mating surface 216. It is also understood that the various couplings, alignment and engagement features, etc., provided between tool arm 206 and sanding tool 220 can also be adapted and/or used for burnishing roller 320.

Referring to FIGS. 2 and 4 together, embodiments of the present disclosure also provide methods for treating component 210 which use, e.g., lathe assembly 202 with sanding tool 220 and/or burnishing roller 320. A method for treating component 210 can include rotating axial target surface 216 about first axis of rotation $A_1$, e.g., by rotating lathe chuck 204 about the same axis. As discussed elsewhere herein, axial target surface 216 can be a mating face of flange 214 configured to contact and/or rotate with other components of a turbomachine system such as turbomachine 100 (FIG. 1). In methods according to the present disclosure, sanding tool 220 and/or burnishing roller 320 can also rotate about second axis of rotation $A_2$, $A_2'$, respectively, such that sanding tool 220 and/or burnishing roller 320 rotate about an axis substantially non-parallel with first axis of rotation $A_1$. Where axial target surface 216 is treated with sanding tool 220, sanding surface 222 can be oriented to rotate about second axis of rotation $A_2$ substantially perpendicular to first axis of rotation $A_1$. In embodiments where axial target surface 216 is treated using burnishing surface 322, second axis of rotation $A_2'$ can also be substantially perpendicular to first axis of rotation $A_1$ or can be oriented to have a particular angular differential $\Theta$, e.g., as is shown in FIG. 4. To treat component 210, rotating sanding and/or burnishing surfaces 222, 322 can contact the rotating axial target surface 216. The contact between each surface, and the material composition(s) of each surface, can yield a polished, burnished surface on axial target surface 216 by application of sanding tool 222 and/or burnishing roller 320 as is discussed herein. As is also discussed herein, an initial surface roughness of axial target surface 216, before the contacting, can be greater than the surface roughness of the polished axial target surface 216. Following contact between the rotating surfaces for a predetermined time, e.g., thirty seconds, ten minutes, two hours, etc., the coefficient of friction of axial target surface 216 can increase as a result of having a greater specific surface area with reduced roughness, formed from the use of sanding and/or burnishing surfaces 222, 322. Where axial target surface 216 of component 210 contacts burnishing surface 322, axial target surface 216 can also be imparted with a residual compressive stress. The increases in friction and residual compressive stress (where applicable) can stem at least in part from an induced Hertzian contact between axial target surface 210 and burnishing surface 322. Hertzian contact generally refers to a stress-inducing form of mechanical contact between two rounded surfaces, in which the two rounded surfaces experience deformation as a result of the mechanical loads pressing them together. To this extent, contact between burnishing roller 322 and axial target surface 216 can increase the frictional and/or deformation effects of Hertzian contact between each component.

In addition to the treatment of component 210 with sanding tool 220 and/or burnishing roller 320, embodiments of the present disclosure can include additional steps for the surface treatment of component 210. For example, methods according to the present disclosure can include removing portions of component 210 with trimming tool 226, before sanding and/or burnishing axial target surface 216 in further method steps. Example trimming processes implemented with trimming tool 226 are discussed elsewhere herein. Use of trimming tool 226 before sander 220 and/or burnishing roller 320 can allow a single lathe assembly 202 can implement a large number of treatment processes upon component 210, without the use of separate machining assemblies. After increasing the frictional coefficient of axial target surface 216 with sanding tool 220 and/or increasing both friction and compressive stress with burnishing roller 320, methods according to the present disclosure can also include deploying component 210 in a turbomachine assembly (e.g., turbomachine 100 (FIG. 1)). Specifically, component 210 can be removed from lathe chuck 204 and then installed within turbomachine 100 (FIG. 1) without executing further modifications, e.g., additional treatments, to axial target surface 216 subsequent to the sanding and/or burnishing described herein. Among other advantages, methods according to the present disclosure offer the ability to completely treat component 210 and portions thereof using lathe assembly 202 with tool arm 206, without requiring further processing in the form of other techniques such as wet grit blasting of component 210.

Figure 5:
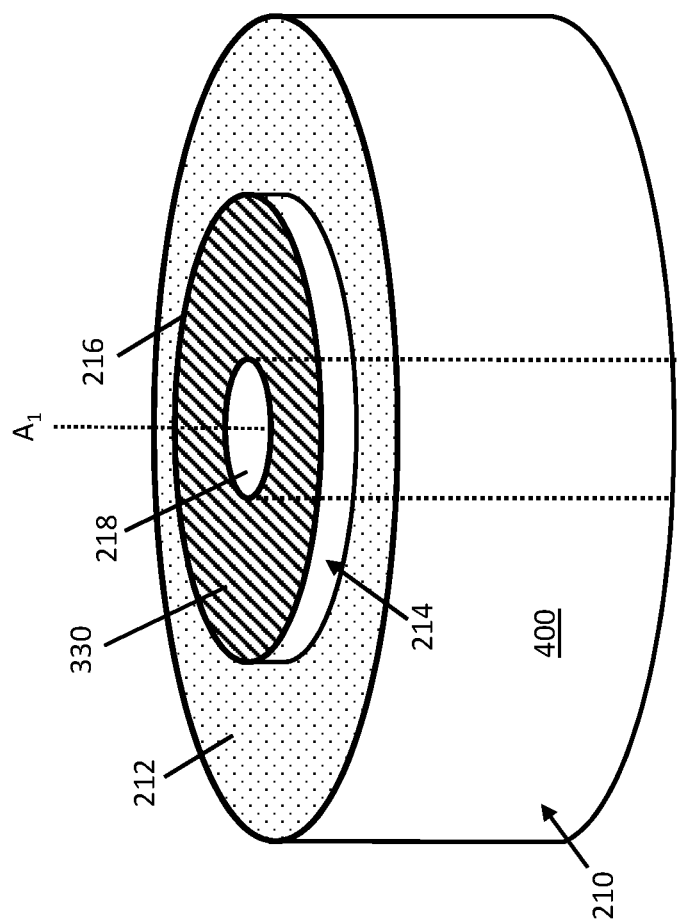
FIG. 5 provides a perspective view of a component according to embodiments of the present disclosure.

Referring to FIG. 5, embodiments of the present disclosure can include component 210 with physical properties stemming from the use of surface treatment tool 200 and/or methods according to the present disclosure provided herein. Turbomachine component 210 can include a body 400 in the form of, e.g., a rotor wheel or other axially-mounted portion of a turbomachine assembly such as turbomachine 100 (FIG. 1). Body 400 can be axially coupled to flange 214, which can be a distinct component coupled to body 400 or can represent a portion of component 210 integral with body 400. It is also understood that the geometrical profile of body 400 can be more complex than embodiment shown in FIG. 5. In any event, aperture 218 can extend axially through flange 214 and body 400, optionally along a centerline axis of component 210, i.e., first axis of rotation $A_1$. Flange 214 can be positioned axially adjacent to body 400, and can include axial target surface 216 thereon, such that axial target surface 216 can axially contact and engage other components of a turbomachine system positioned axially adjacent to and/or aligned with axial target surface 216 during operation. The surface roughness of axial target surface 216 can be reduced after being treated by processes discussed elsewhere herein, and furthermore axial target surface 216 can increase a greater axial specific surface area relative to a specific surface area before treatment. Axial target surface 216, in addition, can include one or more indentations 330 formed, e.g., from embodiments of surface treatment tool 200 and/or during methods according to the present disclosure. Each indentation 330 can thereby be shaped in the form of an affected regional burnishing pattern. Indentations 330 can be distributed substantially evenly throughout axial target surface 216 of flange 214 yet can be absent from other surfaces, including other axial surfaces, of body 400 and/or the remainder of component 210. As is discussed elsewhere herein, axial target surface 216 can be composed of steel, steel alloys, and/or other metallic substances, such that flange 214 is operable for use as a subcomponent of a turbine wheel axially coupled to rotor 114 (FIG. 1) in a turbomachine system such as turbomachine 100 (FIG. 1).

The presence of indentations 330, in addition to the increased frictional coefficient and/or residual compressive stress of axial target surface 216, can indicate that component 210 has previously been treated with embodiments of surface treatment tool 200 and/or methods according to the present disclosure. In addition, component 210 according to embodiments of the present disclosure can also offer other technical and commercial advantages. For example, when included as a part of turbomachine 100 (FIG. 1), component 210 can rotate with the same rotational velocity as axially adjacent components mounted on the same rotor 114. Where applicable, the presence of residual compressive stress in axial target surface 216 can also increase the ability for component 210 to matingly engage other components of a turbomachine system. The imparted residual compressive stress of component 210 can also improve the resistance of component 210 to wear, mechanical shocks, and/or other events or physical factors. More generally, embodiments of the present disclosure can provide a method for surface treatment of component 210 offering, e.g., a reduced time of execution and the ability to implement multiple treatment processes with a single lathe assembly 202 having embodiments of tool arm 206 and its subcomponents therein.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A turbomachine comprising:
   a combustor;
   a compressor section in fluid communication with the combustor;
   a turbine section in fluid communication with the combustor;
   a shaft extending through each of the compressor section and the turbine section; and
   a turbine wheel mounted on the shaft and configured to hold a plurality of blades thereon, the turbine wheel including:
      a rotatable body having an aperture oriented substantially axially relative to an axis of rotation of the rotatable body, such that the shaft passes through the aperture of the rotatable body, wherein the rotatable body is configured to support the plurality of blades; and
      a first flange coupled to and in direct axial contact with the rotatable body, the first flange including:
         an aperture oriented substantially axially relative to the axis of rotation of the rotatable body, wherein the aperture extends axially through the first flange and the shaft passes through the aperture of the first flange, and the aperture of the first flange and the aperture of the rotatable body have a substantially same diameter;
         a surface that faces axially relative to the axis of rotation of the rotatable body, and contacting an axially aligned surface during operation of the turbine wheel; and
         at least one sanding indentation formed within the surface of the first flange, wherein a surface roughness of the first flange along the at least one sanding indentation is less than a surface roughness of a remainder of the turbine wheel, and wherein a specific surface area of the surface of the first flange along the at least one sanding indentation is greater than a specific surface area of the remainder of the turbine wheel, wherein each indentation is shaped in the form of an affected regional burnishing pattern, wherein each of the at least one sanding indentation is only located on the axially facing surface of the first flange, and wherein a frictional coefficient of the first flange along the at least one sanding indentation is greater than a frictional coefficient of a remaining surface area of the first flange; and
      a second flange mounted on the shaft and matingly engaging the first flange, the second flange including:
         at least one sanding indentation in contact with the at least one sanding indentation of the first flange, wherein each of the at least one sanding indentation includes an affected regional burnishing pattern, wherein a material composition of the first flange is configured to induce metallic cohesion with a material composition of the second flange, wherein the first flange and the second flange have a same material composition that includes at least one of chromium (Cr), molybdenum (Mo), Nickel (Ni), or vanadium (V).

2. The turbomachine of claim 1, wherein the at least one sanding indentation of the first flange occupies a substantial entirety of the surface of the first flange.

3. The turbomachine component of claim 1, wherein the first flange extends axially from the rotatable body such that the axially facing surface of the first flange is axially offset from an axially facing surface of the rotatable body, wherein the first flange includes a sidewall extending from the axially facing surface of the rotatable body to the axially facing surface of the first flange, and wherein the sidewall is free of sanding indentations.

4. The turbomachine of claim 1, the second flange further comprising an aperture oriented substantially axially relative to the axis of rotation of the rotatable body, wherein the shaft passes through the aperture of the second flange.

5. The turbomachine of claim 1, wherein the axially aligned surface includes a surface of the second flange that faces axially relative to the axis of rotation of the rotatable body.

6. The turbomachine of claim 5, wherein the at least one sanding indentation of the second flange is formed within the surface of the second flange, and each of the at least one sanding indention is only located on the surface of the second flange.

7. The turbomachine of claim 6, wherein a frictional coefficient of the second flange along the at least one sanding indentation is greater than a frictional coefficient of a remaining surface area of the second flange.

8. A turbomachine comprising:
a combustor;
a compressor section in fluid communication with the combustor;
a turbine section in fluid communication with the combustor;
a shaft extending through each of the compressor section and the turbine section; and
a turbine wheel mounted on the shaft and configured to hold a plurality of blades thereon, the turbine wheel including:
a rotatable body having an aperture oriented substantially axially relative to an axis of rotation of the rotatable body, such that the shaft passes through the aperture of the rotatable body, wherein the rotatable body is configured to support the plurality of blades; and
a first flange coupled to and in direct axial contact with the rotatable body, the first flange including:
an aperture oriented substantially axially relative to the axis of rotation of the rotatable body,
wherein the aperture extends axially through the first flange and the shaft passes through the aperture of the first flange, and the aperture of the first flange and the aperture of the rotatable body have a substantially same diameter;
a surface that faces axially relative to the axis of rotation of the rotatable body, and contacting an axially aligned surface during operation of the turbine wheel; and
at least one sanding indentation formed within the surface of the first flange, wherein a surface roughness of the first flange along the at least one sanding indentation is less than a surface roughness of a remainder of the turbine wheel, and wherein a specific surface area of the surface of the first flange along the at least one sanding indentation is greater than a specific surface area of the remainder of the turbine wheel, wherein each indentation is shaped in the form of an affected regional burnishing pattern, wherein each of the at least one sanding indentation is only located on the axially facing surface of the first flange, and wherein a frictional coefficient of the first flange along the at least one sanding indentation is greater than a frictional coefficient of a remaining surface area of the first flange; and
a second turbine wheel mounted on the shaft, the second turbine wheel including:
a second rotatable body having an aperture oriented substantially axially relative to an axis of rotation of the second rotatable body, such that the shaft passes through the aperture of the second rotatable body; and
a second flange coupled to and in direct axial contact with the second rotatable body and matingly engaging the first flange, the second flange including:
an aperture oriented substantially axially relative to the axis of rotation of the second rotatable body, and the shaft passes through the aperture of the second flange,
wherein the aperture of the second flange and the aperture of the second rotatable body have a substantially same diameter;
an axially facing surface that faces axially relative to the axis of rotation of the second rotatable body; and
at least one sanding indentation formed within the surface of the second flange, wherein a surface roughness of the second flange along the at least one sanding indentation of the second flange is less than a surface roughness of a remainder of the second turbine wheel, the at least one sanding indentation of the second flange in contact with the at least one sanding indentation of the first flange,
wherein the first flange and the second flange have a same material composition that includes at least one of chromium (Cr), molybdenum (Mo), Nickel (Ni), or vanadium (V).

9. The turbomachine of claim 8, wherein the second flange extends axially from the second rotatable body such that the axially facing surface of the second flange is axially offset from an axially facing surface of the second rotatable body.

10. The turbomachine of claim 9, wherein the second flange includes a sidewall extending from the axially facing surface of the second rotatable body to the axially facing surface of the second flange, and wherein the sidewall is free of sanding indentations.

* * * * *